June 1, 1926.

C. F. S. BYRNE 1,587,214

OIL SHIELD FOR MOTOR VEHICLE POWER PLANTS

Filed Sept. 18, 1922

Inventor
Charles F. S. Byrne
By his Attorneys
Blackmore, Spencer & Flint

Patented June 1, 1926.

1,587,214

UNITED STATES PATENT OFFICE.

CHARLES F. S. BYRNE, OF FLINT, MICHIGAN, ASSIGNOR TO GENERAL MOTORS CORPORATION, OF DETROIT, MICHIGAN, A CORPORATION OF DELAWARE.

OIL SHIELD FOR MOTOR-VEHICLE-POWER PLANTS.

Application filed September 18, 1922. Serial No. 588,897.

My invention relates to motor driven vehicles of the type wherein the crank case of the engine whereby the vehicle is driven, the casing of the usual clutch for operatively connecting the engine with and disconnecting the same from the driving wheels of the vehicle, and the casing wherein the transmission gearing between the clutch and the driving wheels is housed form in effect a single unitary casing structure divided by partitions into compartments within which the crank shaft of the engine, the clutch mechanism, and the transmission gearing are located. In such power plants a shaft which is driven through the clutch is commonly supported in a bearing carried by the partition which separates the clutch and the transmission gearing compartments; and the principal object of my invention is to provide means in such a casing structure for preventing oil from passing from the clutch compartment or chamber through or along the bearing for said shaft and into the transmission gearing compartment.

My invention is illustrated as applied to a farm tractor; although the same is equally capable of use in any power plant having a casing structure divided by a partition into compartments, and wherein it is desirable to prevent the flow of oil or equivalent lubricating material from one compartment to another along a shaft extending through a partition separating said compartments.

In the drawing accompanying and forming a part of this specification and wherein the preferred of various embodiments of my invention, all within the scope of the concluding claims and equally within the purview thereof, is illustrated:

Figure 1:
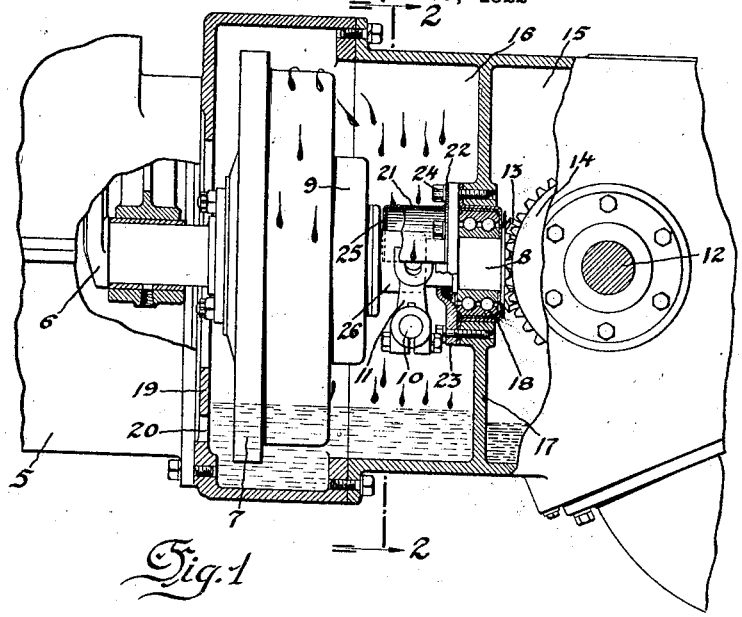
Figure 1 is a fragmentary sectional view showing a unitary casing structure having a crank case and clutch and transmission gearing compartments, such as is above referred to, and in which the passage of oil from the clutch compartment to the transmission gearing compartment is prevented in accordance with my invention.

Referring now to the drawing, the reference numeral 5 designates the crank case of an engine which drives a vehicle, 6 the crank shaft thereof, and 7 the fly wheel of the engine carried by the crank shaft thereof and which forms one member of the usual spring closed clutch for connecting the engine with and disconnecting it from a driven shaft 8; the other member of the clutch being indicated conventionally by the numeral 9 and the same being operated by an oscillating transverse shaft 10 through a yoke member 11 to interrupt the driving action, all as is usual in clutch mechanisms. The driven shaft is operatively connected with the driving wheels of the vehicle through transmission gearing of any type or construction, said shaft in the embodiment of my invention illustrated and wherein the same is illustrated as applied to a farm tractor acting to drive a transverse power take-off shaft 12 through bevel gears 13, 14 and said power take-off shaft being operatively connected with the driving wheels through suitable change speed gearing not shown. The particular construction of the clutch and of the transmission mechanism, however, forms no part of the invention to which this present application relates.

The transmission gearing is located within a chamber 15 which is separated from the chamber 16 within which the clutch mechanism is located by a transverse partition 17, having a ball or equivalent bearing 18 whereby the driven shaft 8 is supported; and the interior of the crank case 5 is separated from the clutch chamber 16 by a transverse partition 19 and is shown as placed in communication with said clutch chamber through an opening 20 in said partition, so that oil may stand at the same level in both the crank case and the clutch chamber. The engine and the clutch mechanism are therefore lubricated by the splash system of lubrication, and by the same body and kind of oil, as will be appreciated.

It therefore follows that the engine casing, the casing whereby the clutch chamber is provided, and the casing wherein the transmission gearing is housed form in effect a single unitary casing structure. The transmission gearing runs in oil of a different quality, however, than the oil in the crank case and clutch chamber and inasmuch as the pressure within the crank case and clutch chamber is commonly in excess of the pressure in the transmission gearing chamber, due for example to leakage past the engine pistons, such oil as falls upon the shaft 8 and about the bearing 18 will, in the absence of my invention, be forced in considerable quantity through the bearing 18 and into the transmission gearing casing by the preponderance of pressure within the clutch casing; thus wasting the oil in the crank case and clutch casing and diluting the thicker and heavier body oil commonly used in the transmission mechanism casing. In fact I found in developing my invention that in tractors not equipped therewith, but otherwise of substantially the construction hereinbefore explained, leakage of oil to the extent of half a gallon a day from the clutch chamber into the transmission gearing chamber was by no means unusual; the quantity thus passing into the transmission gearing casing being a total loss as the oil thus leaking from the clutch casing has to be compensated for by a fresh supply thereto or to the crank casing; while a like quantity of oil escapes from the transmission gearing casing through the main driving axle bearings supported by the casing structure. In addition, the transmission chamber oil being necessarily a more viscous oil than that in the crank case and clutch chamber leakage of the less viscous crank case oil thereinto not only results in excessive leakage from the transmission gearing casing, because of the thinning action of the crank case oil, but, in addition the lubricating qualities of the oil in said last mentioned casing are impaired, because of the reduction in viscosity thereof due also to the thinning action of the crank case oil mixing therewith.

Figure 2:
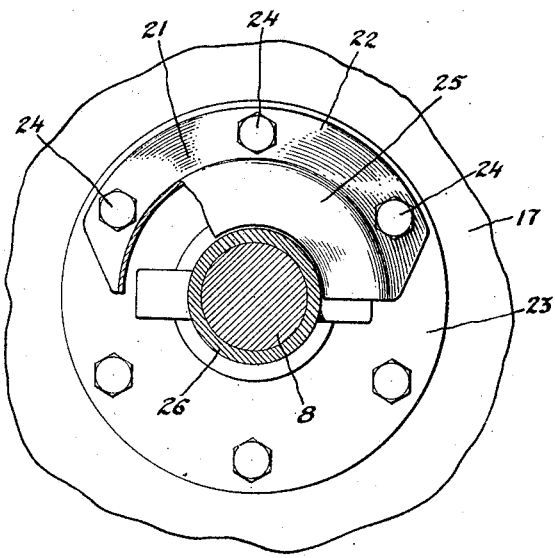
Figure 2 is a fragmentary sectional view upon a considerably larger scale taken upon a vertical transverse plane indicated by the line 2, 2, Figure 1, looking toward the right.

In my invention the leakage of oil above referred to is prevented by a shield member carried by the partition 17 and which member is of general hollow construction, and is preferably of semi-cylindrical form having an open under side, as shown. This shield member 21 is preferably provided with a flanged base 22 so that it may rest upon a holding ring 23 which is associated with the bearing 18 and acts to secure the same in place, and so that it may be held in place relative to the bearing 18 and upon the partition 17 by the same cap screws 24 which serve to fasten the ring 23 to the partition. This shield has an end wall 25 having a semicircular recess in its lower portion which fits closely about a collar 26 through which the clutch is operated to interrupt the driving of the driven shaft 8 by the yoke member 11 aforesaid; and said shield member as a whole is open upon its under side, as best shown in Figure 2, the plane of the open under side of said member being preferably in about the same horizontal plane as the axis of crank shaft and of the driven shaft 8 and said member extending over the shaft and bearing, as will be appreciated.

In view of the premises it will be appreciated that the bearing 18 will be sufficiently lubricated by oil carried into the vicinity thereof by the gearing in the transmission chamber, and by oil thrown up through the open bottom of the shield 21. The greater quantity, however, and in fact practically all of that part of the oil thrown about within the clutch casing which would otherwise run down the partition, or would otherwise find its way into the vicinity of the bearing, will be kept away from the bearing by the shield; with the result that there will be little or no oil upon the shaft 8 or about and within the bearing to be forced along the shaft and through the bearing and into the transmission gearing casing, by the unavoidable preponderance of pressure within the crank case and clutch chamber. The passage of oil from the clutch casing into the transmission gearing casing is thus entirely prevented, or at least reduced to a negligible amount; and the detrimental effects above enumerated of the leakage of a substantial quantity of crank case and clutch chamber oil into the transmission mechanism chamber or casing compartment is obviated.

Having thus described and explained my invention I claim and desire to secure by Letters Patent:

1. In a casing structure of the class described, a crank case and a clutch chamber in open communication with one another; a transmission gearing chamber separated from said clutch chamber by a transverse partition; a bearing carried by said partition and adapted to support a shaft driven through a clutch located within said clutch chamber; and a hollow shield located within said clutch casing and secured to said partition along an oil tight joint, and which shield is open along its under side, and extends about and above said shaft and bearing to thereby prevent access of oil thereto.

2. In a casing structure of the class described, a clutch chamber adapted to contain oil; a transmission gearing chamber separated from said clutch chamber by a transverse partition; a bearing carried by said partition; and a hollow open bottom shield located within said clutch chamber and secured to said partition along an oil tight joint, and extending over said bearing to thereby prevent access of oil thereto.

In testimony whereof I affix my signature.

CHARLES F. S. BYRNE.